United States Patent
Oh et al.

(10) Patent No.: US 10,491,268 B2
(45) Date of Patent: Nov. 26, 2019

(54) COMMUNICATING METHOD BETWEEN MASTER COMMUNICATION DEVICE AND SLAVE COMMUNICATION DEVICE FOR CONTROLLING CRIPPER-UNIT IN HOIST DEVICE OF RAIL CAR

(71) Applicant: Hak Seo Oh, Gyeonggi-do (KR)

(72) Inventors: Hak Seo Oh, Gyeonggi-do (KR); Hyo Seok Park, Gyeonggi-do (KR); Sung Hyuk Youn, Incheon (KR); Youl Kwon Sung, Gyeonggi-do (KR); Sung Ik Kim, Gyeonggi-do (KR); Jin Hwan Ko, Seoul (KR)

(73) Assignee: Hak Seo Oh, Gyeonggi-Do (KR)

( * ) Notice: Subject to any disclaimer, the term of this patent is extended or adjusted under 35 U.S.C. 154(b) by 0 days.

(21) Appl. No.: 15/963,300

(22) Filed: Apr. 26, 2018

(65) Prior Publication Data
US 2019/0238182 A1   Aug. 1, 2019

(30) Foreign Application Priority Data

Feb. 1, 2018   (KR) .......................... 10-2018-0012842

(51) Int. Cl.
*H04B 3/54*   (2006.01)
*H04B 15/00*   (2006.01)

(52) U.S. Cl.
CPC ............. *H04B 3/54* (2013.01); *H04B 15/005* (2013.01)

(58) Field of Classification Search
CPC . H04B 3/54; H04B 3/542; H04B 3/56; H04B 3/544
See application file for complete search history.

(56) References Cited

U.S. PATENT DOCUMENTS

2017/0117715 A1* 4/2017 Muccini .................... H02J 5/00
2017/0368611 A1* 12/2017 Ross .......................... B23B 5/32

* cited by examiner

*Primary Examiner* — Shuwang Liu
*Assistant Examiner* — Gina M McKie
(74) *Attorney, Agent, or Firm* — IPLA P.A.; James E. Bame (57) ABSTRACT

A communicating method between a master and a slave connected through a belt connected to a gripper-unit in a hoist device of a rail car, and to technology in which the master and the slave perform power line communication through a power supply line for supplying power formed in a belt, thereby more stably transmitting and receiving signals in a simple system structure.

9 Claims, 7 Drawing Sheets

COMMUNICATING METHOD BETWEEN MASTER COMMUNICATION DEVICE AND SLAVE COMMUNICATION DEVICE FOR CONTROLLING CRIPPER-UNIT IN HOIST DEVICE OF RAIL CAR

BACKGROUND

The present invention relates to a communicating method between a master and a slave connected through a belt connected to a gripper-unit in a hoist device of a rail car, and to technology in which the master and the slave perform power line communication through a power supply line for supplying power formed in a belt, thereby more stably transmitting and receiving signals in a simple system structure.

Generally, in manufacturing processes of a semiconductor element and a liquid crystal display device etc., the manufacturing goods are transferred to the manufacturing equipment of each manufacturing process by using an automated material handling system (AMHS), so that the corresponding goods are manufactured according to the manufacturing processes of each manufacturing equipment. Such an automated material handling system utilizes a rail car for transferring a carrier of receiving a semiconductor substrate or a liquid crystal substrate to the manufacturing station located on the manufacturing process line and transferring the carrier of again receiving the goods completely processed in the corresponding manufacturing equipment to the next manufacturing equipment.

Depending on the movement method thereof, the rail car includes an automated rail car (AGV) for driving through the wheel, a rail guided vehicle (RGV) for driving along the guide rail located at the bottom, and an overhead hoist transport (OHT) for driving a guide rail installed in the ceiling. These unmanned transporting devices are moved to the corresponding manufacturing equipment by using the wheel itself or along the bottom rail or the overhead rail and it carries the carrier onto or carries the carrier out the manufacturing equipment by using an operating arm or a hoist and a gripper.

Figure 1:
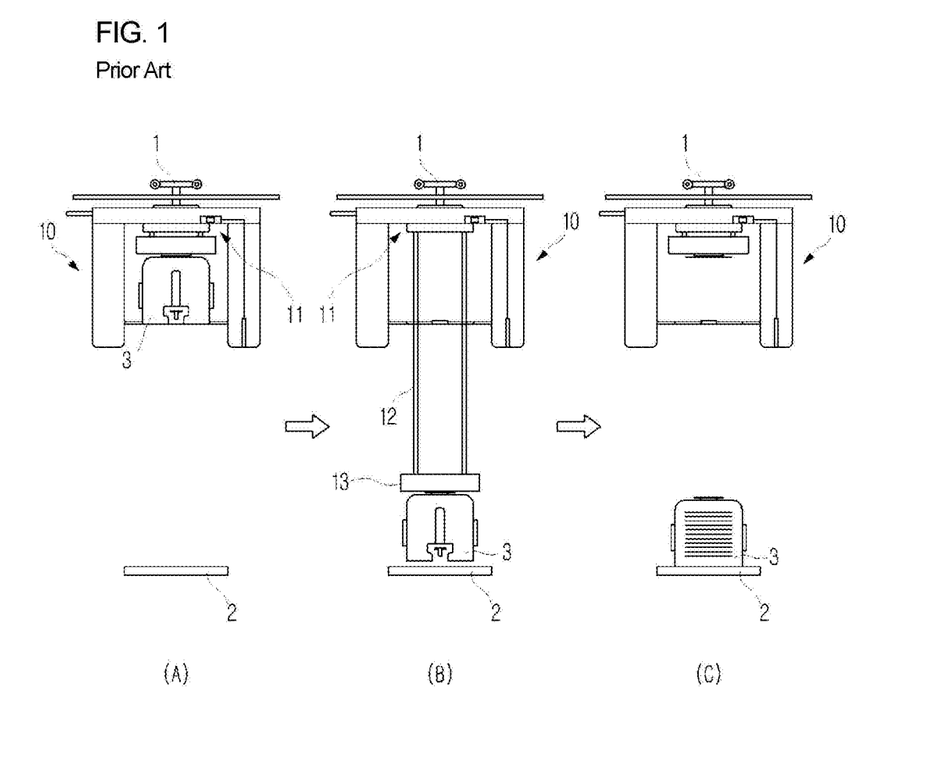
FIG. 1 is a diagram for explaining a configuration of a rail car in a conventional automated material handling system.

FIG. 1 is a diagram for explaining a configuration of a rail car in a conventional automated material handling system and shows a process of carrying out a hoist operation of the rail car. As shown in FIG. 1, (A) is a stage in which the rail car 10 having a carrier (3) moves to a position of the manufacturing equipment (2) along a rail (1), (B) is a stage in which the carrier (3) is placed on the manufacturing equipment (2) by descending a belt (12) by means of the rail car (10), and (C) is a stage in which the rail car (10) lifts the belt (12) while placing the carrier (3) in the manufacturing equipment (2) so as to perform the corresponding process operation on the carrier (3) in the manufacturing equipment (2).

Referring to FIG. 1, the rail car (10) includes a hoist (11), a belt (12), and a gripper unit (13).

When the rail car (10) is located to the manufacturing equipment (2) by moving it along the rail (1), the rail car (10) allows the gripper unit (13) to move up and down by means of the belt 12, so that it carries the carrier (3) onto or carries the carrier (3) out the manufacturing equipment (2).

At this time, the hoist (11) includes a master controller (not shown) on the upper side of the belt (12) and a slave controller (not shown) on the lower side of the belt (12), that is, on a side of the gripper unit (13) and a power supply line and a communication line are formed on the belt (12), so that it provides the power and transmits and receives information related to the gripper operation between the controller of the rail car and the controller of the gripper unit.

That is, the hoist (11) provides the control signal for hoist operation to the slave communication unit via the belt (12) in the master communication unit and provides the control signal related to the hoist operation to the gripper unit (13) in the slave communication unit, so that it can perform the actual operations of moving the gripper unit (13) in a fastened state of the carrier (3) or placing the carrier 3 on the manufacturing equipment 2 and so on.

At this time, the conventional hoist (11) is configured to perform the communication between the master communication unit and the slave communication unit by providing a conductive line for power supply and a conductive line for communication inside the belt, respectively. However, it is a cumbersome to form the conductive lines in the belt.

Further, in the case of the rail car having a structure in which the belt is lifted and lowered in the manner of a normal slip ring, there is a problem of a contact failure due to a contamination, a deformation, a friction etc. of the slip ring or the brush.

Accordingly, where the serial communication is performed using the conductive lines formed on the belt, since the noise is generated in the transmitting and receiving data, there is a problem in that it is difficult to secure reliability of data transmitted and received through the belt.

Thus, it has been proposed a method of performing an optical communication between a body of the rail car and a lifting and descending rigid body in the structure of lifting and descending the belt by the slip ring manner. However, a communication error can occur due to an optical noise interference with the other rail car located in the periphery thereof. Also, there is a problem that the optical communication is interrupted, when the gripper unit is vibrated in all directions.

In addition, since the optical communication generally has a low communication speed and has a limitation in increasing the number of data bits, there is a disadvantage in that the expandability of additional functions such as a collision detection, a vibration detection, a power management etc. can be deteriorated.

SUMMARY OF THE INVENTION

The present invention has been made in consideration of the problems described above and an object of the present invention is to provide a communicating method between a master and a slave connected through a belt connected to a gripper-unit in a hoist device of a rail car in which a master controller and a slave controller perform power line communication through a power supply line for supplying power formed in a belt, thereby more stably transmitting and receiving signals in a simple system structure.

Another object of the present invention is to provide a communicating method between a master communication device and a slave communication device for controlling a gripper-unit in a hoist device of a rail car, in which signals received by power line communication are analyzed to extract a noise pattern, and signal transmission and reception are performed between a master communication unit and a slave communication unit in a section where noise does not occur, thereby performing more reliable communication.

Further another object of the present invention is to provide a communicating method between a master communication device and a slave communication device for controlling a gripper-unit in a hoist device of a rail car, which analyzes voltage and current waveforms of a power line communication line installed in a belt to determine whether the belt is abnormal in advance to prevent an accident at the time of carrier transport, analyzes voltage magnitude of a communication signal received by power line communication, automatically raises transmission voltage when the signal is smaller than noise, thereby stably performing signal transmission and reception between the master communication unit and the slave communication unit.

According to an aspect of the invention to achieve the object described above, there is provided a communicating method between a master communication device and a slave communication device for controlling a gripper-unit in a hoist device of a rail car, in which the master communication device connected to a rail car controller and the slave communication device connected to the gripper-unit are connected through a belt to operate the gripper-unit in accordance with a control signal of the rail car controller, thereby performing a hoist work, the communicating method including: a first step in which the master communication device provides power supplied from the rail car controller to the slave communication device through a power supply line formed in a belt, and the slave communication device supplies the power provided from the master communication device to the gripper-unit; a second step in which the master communication device modulates a control signal provided from the rail car controller, overlaps the modulated control signal with power, and transmits the modulated control signal overlapped with the power to the slave communication device through the power supply line, and the slave communication device transmits a signal including a response to the control signal to the master communication device through the power supply line formed in the belt; and a third step in which the master communication device or the slave communication device compares voltage of the signal received through the power supply line with preset reference voltage to determine a communication state through the power supply line, and when it is determined as a communication abnormality state, communication abnormality state information is provided to the rail car controller through the master communication device.

Preferably, in the second step, the master communication device or the slave communication device detects noise from the signal received through the power supply line, extracts a noise pattern according to a noise occurrence time point, and sets a section where noise does not occur is set to a signal transmission time point on the basis of the noise pattern to perform a signal transmission process through the power supply line.

Preferably, in the second step, the master communication device or the slave communication device detects signal strength of noise, amplifies a signal to have a signal level higher than the signal strength of noise to perform the signal transmission process through the power supply line.

Preferably, in the second step, when the noise pattern extracted in the master communication device is a pattern similar to a preset slip ring replacement pattern, slip ring replacement information is provided to the rail car controller.

Preferably, in the first step, the master communication device detects a waveform of the power supplied from the rail car controller, compares the detected power waveform with a preset reference power waveform, stops, when the power waveform is not a normal power waveform, the supplying of the power to the slave communication device, and provides power abnormality state information to the rail car controller.

Preferably, in the third step, the master communication device or the slave communication device determines the communication state on the basis of a signal fed back and received through the power supply line or provided from the opponent controller.

Preferably, in the second step, the master communication device or the slave communication device adds CHECKSUM information for error detection for a signal to be transmitted through the power supply line, to the signal, and modulates and transmits the signal, and the opponent controller analyzes, when error occurs in the CHECKSUM information at the time of demodulating the received signal, the waveform of the received signal, extracts a noise position, and changes a data state of a bit corresponding to the noise position, thereby restores data.

Preferably, the communicating method between a master communication device and a slave communication device for controlling a gripper-unit in a hoist device further includes a step in which, in a state where the slave communication device is connected to one or more sensors including a gyro sensor and a tilt sensor in the hoist device and the gripper-unit and receives detection signals detected by the sensors, the slave communication device compares and determines, on the basis of detection signal provided from the sensor, a state of at least one of a belt movement distance, a belt movement speed, a left and right movement distance of the gripper-unit, a collision degree of the hoist device, and a tilt degree of the belt with preset reference information, and transmits work abnormality state information to the master communication device through the power supply line when difference from the reference information more than a predetermined range, and the master communication device transmits the work abnormality state information received from the slave communication device to the rail car controller.

Preferably, the communicating method between a master communication device and a slave communication device for controlling a gripper-unit in a hoist device further includes a step in which, in a state where each of the master communication device and the slave communication device is provided with a wireless communication module for performing wireless communication, in the third step, the master communication device or the slave communication device mutually transmits and receives the communication abnormality state information through the wireless communication modules at the time of determining the communication abnormality state through the power supply line.

BRIEF DESCRIPTION OF THE DRAWINGS

The above and other objects, features and advantages of the present invention will be more apparent from the following detailed description taken in conconfluence with the accompanying drawings, in which.

DETAILED DESCRIPTION OF THE PREFERRED EMBODIMENT

Hereinafter, a preferred embodiment according to the present invention will be described in detail with reference to the accompanying drawings. Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them. This invention can be implemented in many different forms without departing from technical aspects or main features.

Figure 2:
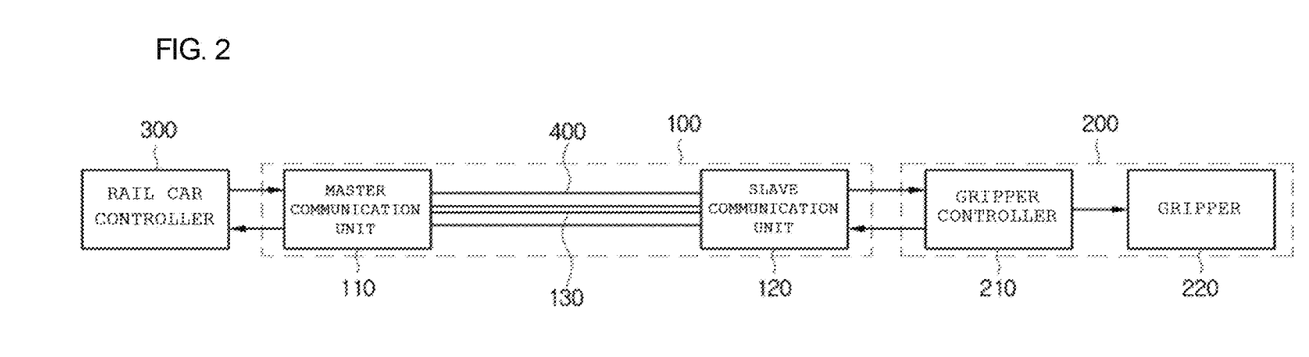
FIG. 2 is a diagram illustrating a main configuration for explaining a communicating system between a master and a slave in a hoist device of a rail car according to the present invention.

FIG. 2 is a diagram illustrating a main configuration for explaining a communicating system between a master and a slave in a hoist device of a rail car according to the present invention.

Referring to FIG. 2, a rail car according to the present invention includes a hoist device (100), a gripper-unit (200), and a rail car controller (300).

The rail car controller (300) controls overall operations for the rail car, and provides power and control information for hoist work to the hoist device (100).

The hoist device (100) is configured such that a master communication unit connected to the rail car controller (300) and a slave communication unit connected to the gripper-unit (200) are connected through a belt (400). In this case, a master including a master controller (110) includes a lifting body (not illustrated) including a motor for lifting up and down the belt (400). The present invention relates to communication between a master and a slave, and FIG. 2 illustrates a main configuration for communication where a master communication unit (110) is illustrated for the master and a slave communication unit (120) is illustrated for the slave. In addition, physically, one end of the belt (400) is connected to the lifting body on the master side, the other end thereof is connected to the gripper-unit (200) on the slave side, and an up and down position of the gripper-unit (200), more specifically, an up and down position of a gripper (220) is set in correspondence with lifting up and down of the belt (400).

In FIG. 2, in the hoist device (100), the master communication unit (110) connected to the rail car controller (300) is electrically connected to the slave communication unit (120) connected to a gripper controller (210) through a power supply line (130) provided in the belt (400). In other words, the master communication unit (110) and the slave communication unit (120) perform power line communication through the power supply line (130) formed in the belt (400).

In this case, the number of belts (400) is in multiple numbers, normally three or four to stably connect a rail car body (master side structure) and the gripper-unit (200), and the master communication unit (110) is electrically connected to the slave communication unit (120) through the power supply line (130) formed in one of the belt (400).

The master communication unit (110) may use serial communication as a communication method for transmitting and receiving data to and from the rail car controller (300), and may perform parallel IO communication through IO points when there is no serial communication function in the rail car controller (300).

In addition, the master communication unit (110) and the slave communication unit (120) analyze signals received through the power supply line (130) formed in the belt (400) to detect whether communication is abnormal in the hoist device (100), and transmit, when a communication abnormality state occurs, this to the rail car controller (300). In the rail car controller (300), fault diagnosis of the hoist device (100) is performed on the basis of communication abnormality state information received from the master communication unit (110), thereby preventing an accident and component failure according to the hoist work.

The slave communication unit (120) provides the power supplied through the power supply line (130) provided in the belt (400) as driving power of the gripper-unit (200), and provides a control signal for carrier transport or return received from the master communication unit (110) to the gripper controller (210), thereby operating the gripper (220) in correspondence with the control signal.

In addition, the slave communication unit (120) checks whether work states for the gripper-unit (200) and the hoist device (100) collected through a sensor are abnormal, and reports, when an abnormal state occurs, this to the master communication unit (110), thereby preventing an accident and component failure through fault diagnosis of the hoist device (100).

Figure 3:
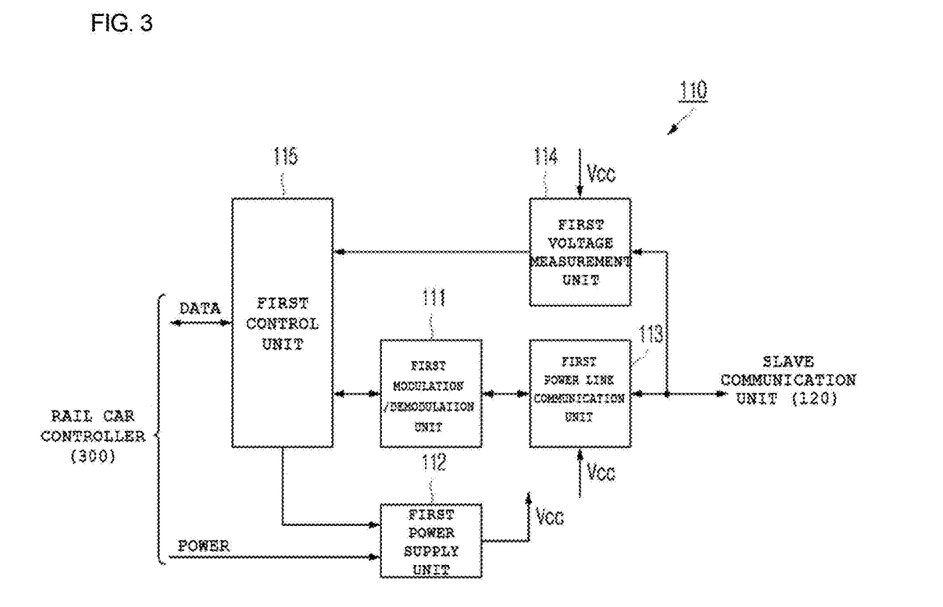
FIG. 3 is a block diagram functionally illustrating an internal configuration of the master communication unit (110) illustrated in FIG. 2.

FIG. 3 is a block diagram functionally illustrating an internal configuration of the master communication unit (110) illustrated in FIG. 2.

Referring to FIG. 3, the master communication unit (110) includes a first modulation/demodulation unit (111), a first power supply unit (112), a first power line communication unit (113), a first voltage measurement unit (114), and a first control unit (115).

The first modulation/demodulation unit (111) modulates a control signal input from the rail car control unit (300), and demodulates a response signal input from the slave communication unit (120). The first modulation/demodulation unit provides the modulated control signal to the first power line communication unit (113), and provides the demodulated response signal to the first control unit (115). The modulation method may be various modulation methods such as FSK, S-FSK, BPSK, SS, and OFDM, and the like.

The first power supply unit (112) supplies the power supplied from the rail car control unit (300) to a driving power supply (Vcc) of the master communication unit (110), and provides the power to the first power line communication unit (113). In this case, the first power supply unit (112) includes a filter for blocking noise and a filter for impedance matching of a power supply terminal to supply power more stably.

The first power line communication unit (113) overlaps the modulated control signal provided from the first modulation/demodulation unit (111) with the power provided from the first power supply unit (112) in accordance with the control of the first control unit (115), and transmits the control signal overlapped with the power to the slave controller (120) through the power supply line (130).

In addition, the first power line communication unit (113) receives the modulated signals transmitted from the slave communication unit (120) through the power supply line (130), that is, the response signal and various state signals, and provides the signals to the first modulation/demodulation unit (111).

The first voltage measurement unit (114) measures voltage for the signals received through the power supply line (130), and provides the measured voltage values to the first control unit (115). The first voltage measurement unit (114) measures voltage for the control signal transmitted and fed back through the power supply line (130) or the reception signal transmitted from the slave communication unit (120).

In addition, the first voltage measurement unit (114) analyzes a voltage waveform for the power provided from the first power supply unit (112), and provides the waveform to the first control unit (115).

The first control unit (115) controls overall operations for the master communication unit (110), and includes a memory for storing reference information including a reference power waveform, a reference voltage level, a communication abnormality determination reference voltage range, and a slip ring replacement cycle pattern, and various kinds of information processed in the first control unit (115).

Such a first control unit (115) compares the voltage level for the reception signal provided from the first voltage measurement unit (114) with preset reference voltage to determine a communication state. In this case, when the first control unit (115) determines that the reception signal voltage level is different from the preset reference voltage level by a predetermined range or more, determines that failure occurred in communication, and provides communication state information corresponding thereto, that is, communication abnormality state information to the rail car controller (300).

In addition, the first control unit (115) extracts a noise component from the signal received through the power supply line (130), and generates a noise pattern corresponding to a noise occurrence cycle. This came from that generally the noise component occurring internally in the rail car has a predetermined pattern as illustrated in FIG. 4.

The first control unit (115) predicts signal transmission time point information to transmit the modulated control signal in an idle section where noise does not occur in the noise pattern, and provides the signal transmission time point information to the first power line communication unit (113). In other words, as illustrated in FIG. 4, the transmission time point may be variably set to transmit the modulated signal in the section where noise does not occur.

Figure 4:
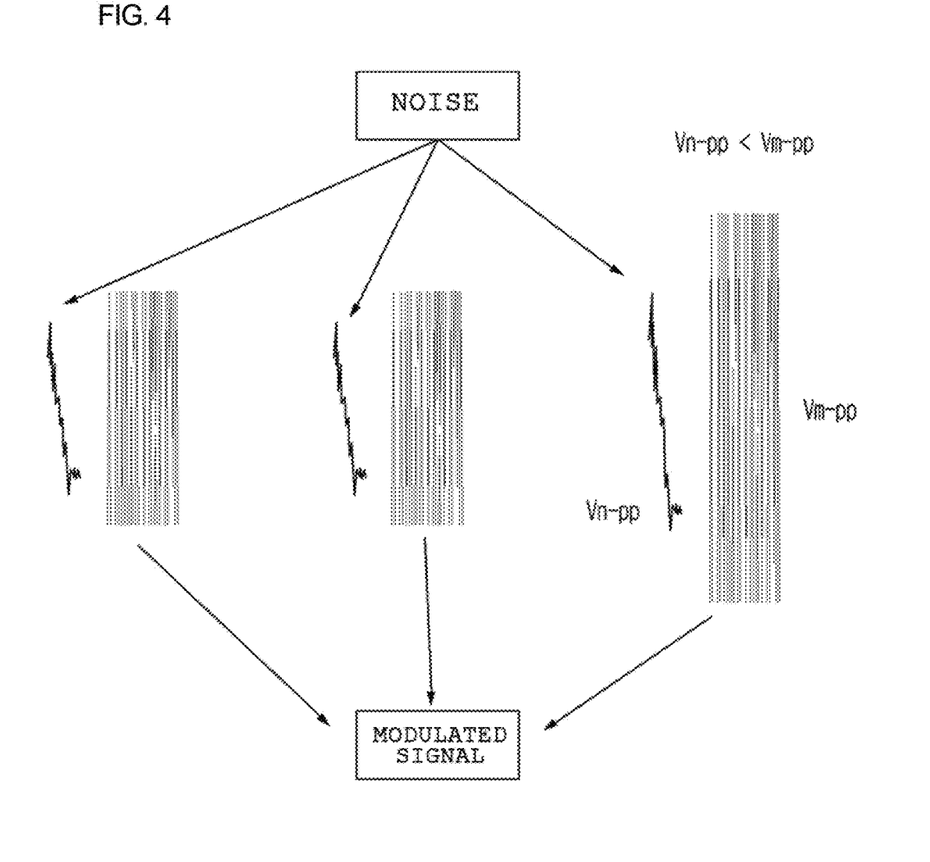
FIG. 4 is a diagram for explaining a transmit control process of a control signal according to a noise pattern performed in a first control unit (115) shown in FIG. 3.

In addition, the first control unit (115) confirms noise signal strength at the time of extracting a noise component, sets a signal level (Vm-pp) for the modulated signal to have signal strength higher than noise (Vn-pp) as illustrated in FIG. 4, provides the signal level to the first power line communication unit (113). In FIG. 4, it is set that the signal level of the modulated signal is changed in correspondence with noise of the previous time point, but the signal level for the modulated signal may be set on the basis of the maximum noise signal strength during a predetermined time.

In addition, the first control unit (115) determines similarity between the noise pattern and the pattern corresponding to the preset slip ring replacement cycle, and may provide slip ring replacement request information to the rail car controller in case of corresponding to the slip ring replacement cycle.

In addition, the first control unit (115) generates a CHECKSUM packet for error detection for the control signal provided to the slave communication unit (120), provides the CHECKSUM packet to the first modulation/demodulation unit (111), and adds the CHECKSUM packet to a data packet of the control signal to control to perform a modulation process. When the slave communication unit (120) provides the signal to which the CHECKSUM is added to the master communication unit (110), the first control unit (115) detects, when a problem occurs in the CHECKSUM of the demodulated reception signal obtained by modulating the signal, a noise occurrence position in the corresponding reception signal, changes a data state of a bit corresponding to the noise occurrence position, and finds data in which the CHECKSUM is normal to restore original data. For example, when the data of the bit corresponding to the noise occurrence position of the reception signal is "1", the data is changed to "0", and when the data is "0", the data is changed to "1".

In addition, the first control unit (115) provides the signal demodulated from the first modulation/demodulation unit (111) to the rail car controller (300). In this case, the demodulated signal may be a response signal for hoist work received from the slave communication unit (120), communication state information, work state information, and the like.

In addition, the first control unit (116) compares the power voltage waveform provided from the first voltage measurement unit (114) with a preset reference power voltage waveform, stops, when the power waveform is not a normal power waveform, the supplying of the power to the slave communication device, and provides power abnormality state information to the rail car controller (300).

Figure 5:
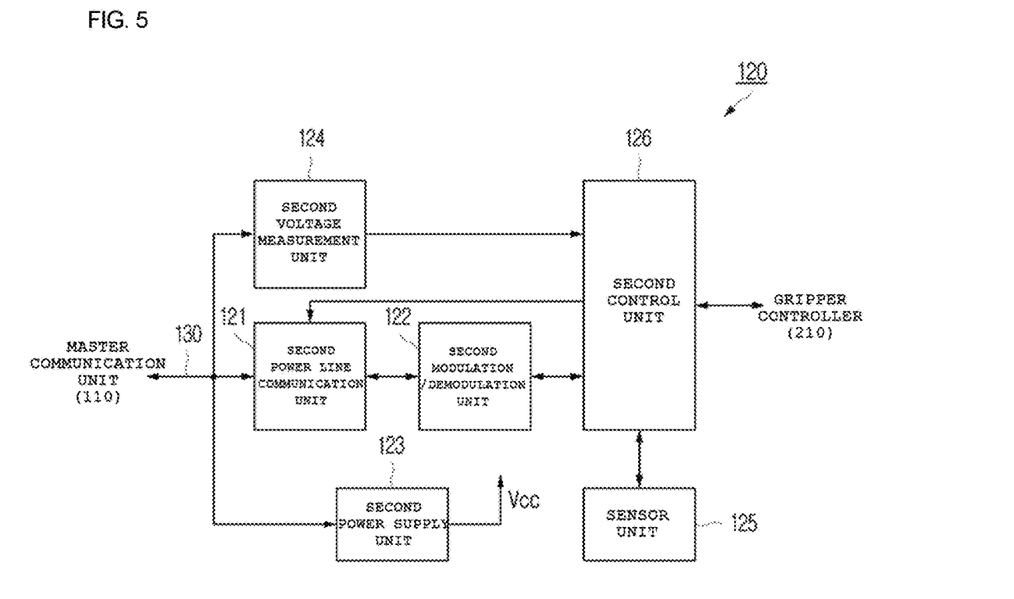
FIG. 5 is a block diagram functionally illustrating an internal configuration of the slave communication unit (120) illustrated in FIG. 2.

FIG. 5 is a block diagram functionally illustrating an internal configuration of the slave communication unit (120) illustrated in FIG. 2.

Referring to FIG. 5, the slave communication unit (120) includes a second power line communication unit (121), a second modulation/demodulation unit (122), a second power supply unit (123), a second voltage measurement unit (124), a sensor unit (125), and a second control unit (126).

The second power line communication unit (121) separates the modulated control signal from power received through the power supply line (130) provided in the belt (400), provides the control signal to the second modulation/demodulation unit (122), and supplies the power to the second power supply unit (123).

In addition, the second power line communication unit (121) transmits the modulated signal provided from the second modulation/demodulation unit (122), to the master communication unit (110) through the power supply line (130) provided in the belt (400) in accordance with the control of the second control unit (126).

The second modulation/demodulation unit (122) demodulates the control signal provided from the second power line communication unit (121), and modulates signals provided from the second control unit (126), that is, a response signal or communication state information according to hoist work, or work state information. The second modulation/demodulation unit (122) provides the demodulated control signal to the second control unit (126), and provides the modulated signal to the second power line communication unit (121).

The second power supply unit (123) supplies the power supplied from the master communication unit (110) through the power supply line (130) provided in the belt (400) to a driving power supply (Vcc) of the slave communication unit (120), and provides the power to the gripper control unit (210) to be used as supply power of the gripper-unit (200). In this case, the second power supply unit (123) may include a filter for blocking noise, and a filter for impedance matching of a power supply terminal.

The second voltage measurement unit (124) measures voltage for signals received through the power supply line (130), and provides the measured voltage values to the second control unit (126). The second voltage measurement unit (124) measures voltage for the response signal transmitted and fed back to the master communication unit (110) through the power supply line (130) or the reception signal transmitted from the master communication unit (110).

The sensor unit (125) may include a gyro sensor, an acceleration sensor, a tilt sensor, and the like, and detects states such as a movement distance, a movement speed, left and right shaking, and shock of the belt (400). The sensor unit (125) provides state information detected by the sensors to the second control unit (126).

The second control unit (126) controls overall operations for the slave communication unit (120), and includes a memory for storing various kinds of reference information including a reference voltage level, a communication abnormality determination reference voltage range, and a reference state value for each sensor, and information processed in the second control unit (126).

Such a second control unit (126) compares the voltage level for the reception signal provided from the second voltage measurement unit (124) with a preset reference voltage level to determine a data communication state through the power supply line (130).

In the same manner as that of the first control unit (115) of the master communication unit (110), the second control unit (126) determines a communication state for signals transmitted and received through the power supply line (130), and transmits, when it is determined as a communication abnormality state, state information about this to the master communication unit (110).

In addition, the second control unit (126) extracts a noise component from the control signal, generates a noise pattern corresponding to a noise occurrence cycle, and controls the second power line communication unit (121) to transmit the modulated signal at the transmission time point when noise does not occur in a noise pattern at a signal level higher than that of the noise signal.

In addition, in the same manner as that of the first control unit (115), the second control unit (126) adds a CHECKSUM packet for error detection for signals provided to the master communication unit (110), and restores, when a problem occurs in the CHECKSUM, the CHECKSUM by detecting a noise occurrence position.

In addition, the second control unit (126) compares the state detection signal applied from the sensor unit (125) with a reference detection signal for each sensor, determines that abnormality occurred in work environment when a difference more than a predetermined level occurs, and transmits work state information corresponding thereto to the master communication unit (110).

Figure 6:
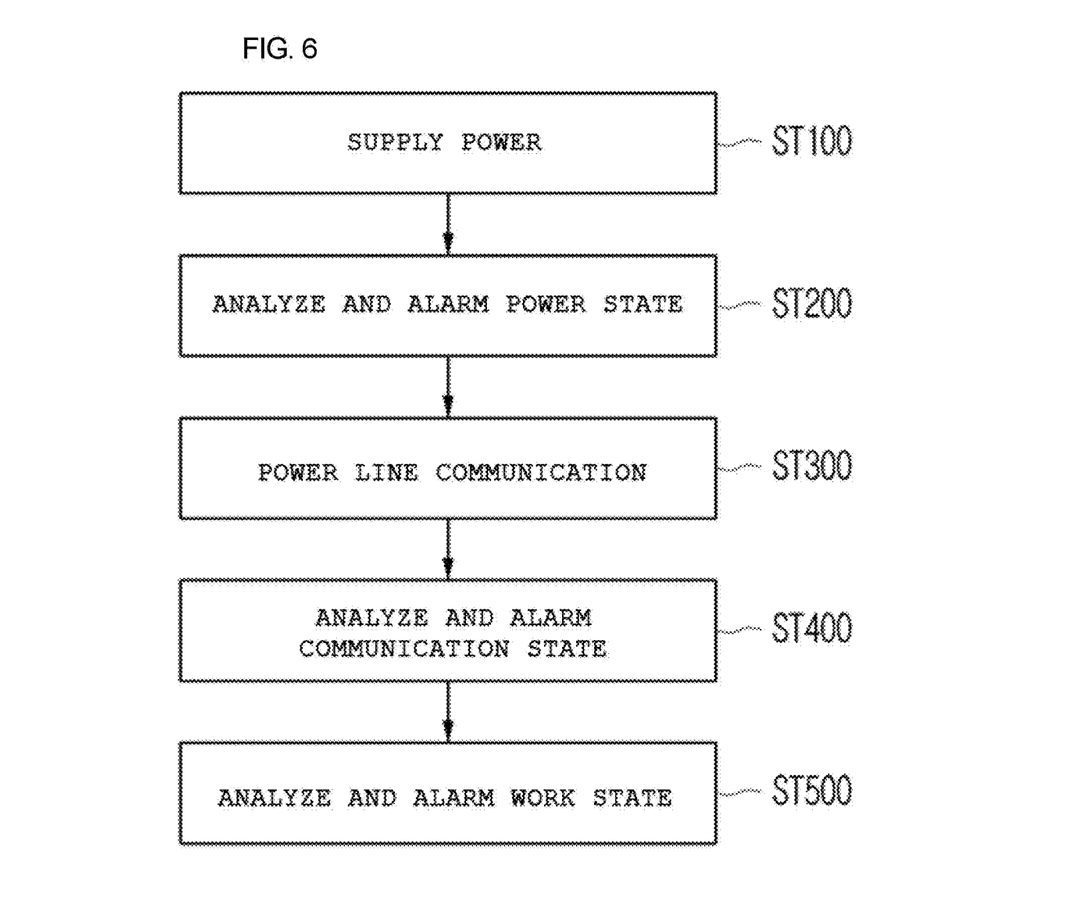
FIG. 6 is a diagram for explaining an overall communicating method between a master communication unit and a slave communication unit in a hoist device of a rail car according to the present invention.
Figure 7:
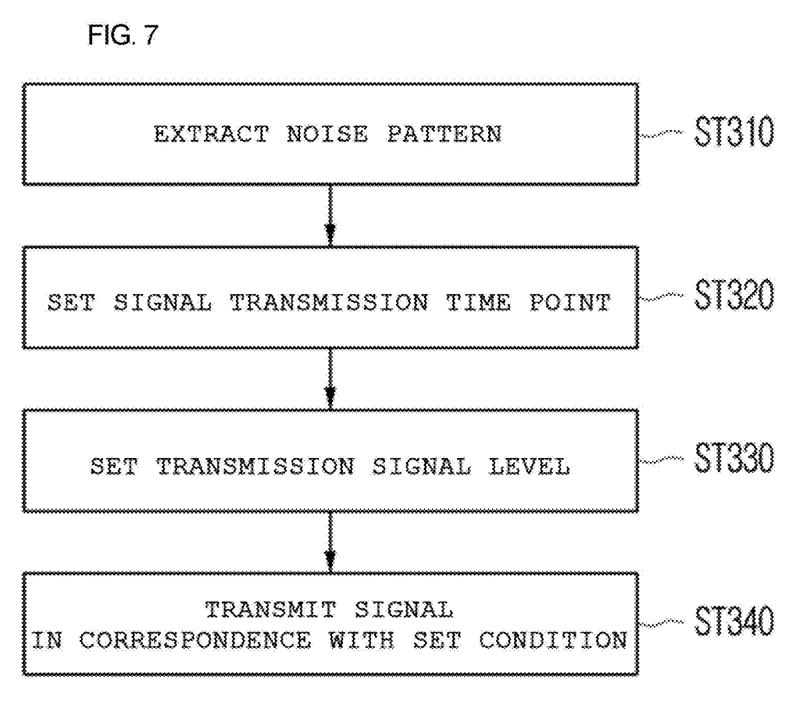
FIG. 7 is a diagram for explaining an operation of a power line communication process (ST300) illustrated in FIG. 6.

Subsequently, the communicating method between a master communication device and a slave communication device for controlling a gripper-unit in a hoist device of a rail car with the configuration described above will be described with reference to the drawings illustrated in FIG. 6 and FIG. 7. FIG. 6 is a diagram for explaining an overall communicating method between a master communication unit and a slave communication unit, and FIG. 7 is a diagram for explaining an operation of a power line communication process (ST300) illustrated in FIG. 6 in more detail.

Hereinafter, the communicating method between a master communication unit and a slave communication unit will be described by applying it to a lifting down operation of a gripper-unit.

When the rail car moves through a rail and stops at a manufacturing facility position to work, the master communication unit (110) drives the belt (400) to lift down the gripper-unit (200) to be positioned at the manufacturing facility.

In the state, the rail car controller (300) supplies a predetermined level of power to the master communication unit (110), and the master communication unit (110) supplies power to the slave communication unit (120) through the power supply line (130) formed in the belt (400), thereby setting the gripper-unit (200) in an operation standby state (ST100).

In this case, the master communication unit (110) compares a waveform of the power supplied from the rail car controller (300) with a preset reference power waveform, and can supply power to the slave communication unit (120) only when it is determined that the waveform is a normal waveform. In addition, when a ripple occurs in the power voltage or the voltage waveform is different from the reference power waveform by a predetermined range or more due to occurrence of voltage-down or the like, the master communication unit (110) provides power abnormality state information to the rail car controller (300) while not supplying power to the slave communication unit (120) (ST200). This is to prevent an accident from occurring due to unstable power, by providing the power abnormality state to the rail car controller (300) in advance considering that an accident or an error may occur in hoist work when unstable power is supplied to the gripper-unit (200).

Subsequently, when the master communication unit (110) receives a control signal for hoist work from the rail car controller (300), the master communication unit (110) modulates the control signal, overlaps the modulated control signal with power, transmits the control signal to the slave communication unit (120) through the power supply line (130), and receives the signal provided from the slave communication unit through the power supply line (130), thereby performing power line communication (ST300).

As illustrated in FIG. 7, the power line communication process (ST300) includes a step of analyzing the signal received from the power supply line (130) and extracting a noise pattern corresponding to the time point when noise occurs (ST310), a step of variably setting a noise idle section where noise does not occur as a data transmission time point on the basis of the noise pattern (ST320), a step of extracting signal strength for noise and setting a signal level for the transmission signal to have a signal level higher than signal strength of the extracted noise by a predetermined level or higher (ST330), and a signal transmission step of amplifying and transmitting the transmission signal to have preset signal strength at a transmission time point set on the basis of the noise pattern (ST340).

In addition, in the signal transmission step (ST340), CHECKSUM data for error check is added to the transmission signal and modulated, and the transmission signal is transmitted through the power supply line (130).

In other words, through such power line communication, the slave communication unit (120) performs hoist work through the gripper-unit (200) in correspondence with the control signal provided from the master communication unit (110).

The power line communication process described above may be performed in each of the master communication unit (110) and the slave communication unit (120).

In addition, at the time of power line communication, the master communication unit (110) or the slave communication unit (120) performs a communication state alarm process of analyzing a communication state on the basis of transmission and reception signals, and providing, when being determined as a communication abnormality state, state information to the rail car controller (300) (ST400).

For example, the master communication unit (110) receives a feedback signal for the control signal transmitted to the slave communication unit (120) through the power supply line (130), and compares a voltage level for the feedback-received control signal with a preset reference voltage level, thereby determining a communication abnormality state. In other words, the slave communication unit (120) analyzes voltage and current wave form of the power supply line (130), thereby determining whether the belt (400) is abnormal in advance.

In addition, the master communication unit (110) compares a voltage level for a signal received from the slave communication unit (120) through the power supply line (130) with a preset reference voltage level, thereby determining a communication abnormal state.

Also in the slave communication unit (120), it is possible to analyze a communication state in the same manner as described above, and such communication state analysis may be performed in both of the master communication unit (110) and the slave communication unit (120) or may be performed in one communication unit of the master communication unit (110) and the slave communication (120).

In other words, the slave communication unit (120) determines a communication abnormality state between the master communication unit (110) and the slave communication unit (120), and provides the abnormality state information to the master communication unit (110), and also it is possible that the master communication unit (110) may transmit the communication abnormality state information received from the slave communication unit (120) to the rail car controller.

In addition, in a work state alarm process (ST500), the slave communication unit (120) receives a state detection signal provided from the sensor unit (125), compares the level of the state detection signal with a reference detection signal registered for each sensor, analyzes a physical work state of the hoist device in accordance with hoist work, and generates and provides work abnormality state information to the master communication unit (110) when it is determined that a work abnormality state occurred as the analysis result, and the master communication unit (110) transmits the work abnormality state information received from the slave communication unit (120) to the rail car controller.

In other words, the slave communication unit (120) may analyze at least one state of a movement distance and a movement speed of the belt, and left and right shaking and collision of the belt through a gyro sensor. For example, the slave communication unit (120) drives a motor (not illustrated) in the rail car controller for hoist work, compares a movement distance or a transport speed of the belt (400) with an actual movement distance or a transport speed detected through the gyro sensor, and may determine a case where deviation equal to or more than a predetermined degree occurs, as a work abnormality state. In addition, when the gripper is shaken due to collision with an external device or a human, the slave communication unit (120) detects a left and right movement distance or a collision degree through the gyro sensor, and may determine, when deviation equal to or more than a predetermined degree or more occurs, this case as a work abnormality state.

In addition, the slave communication unit (120) may determine a work abnormality state on the basis of tilting equal to or more than a predetermined angle due to abnormality of the belt (400) connected to the gripper by using a tilt detection sensor.

When such a work abnormality state occurs, the slave communication unit (120) transmits work abnormality state information to the master communication unit (110), and temporarily stops the hoist work which is being performed currently. In other words, the slave communication unit (120) does not transmit a control signal to the gripper-unit.

Meanwhile, in the present invention, the master communication unit (110) and the slave communication unit (120) may be additionally provided with wireless communication modules, and may perform more stable hoist work by transmitting and receiving communication state information through wireless communication by using the wireless communication modules when abnormality occurs in power line communication.

In this case, an ID and channel information necessary for wireless communication may be set at the time of initial setup, or may be set by a method of receiving the ID and channel information of the wireless communication module through power line communication and automatically initializing them. In this case, since the wireless communication is used only during a short time as auxiliary means at the time of abnormal power line communication, it is possible to minimize interference with other wireless devices.

According to the present invention, a control signal necessary for a hoist work is transmitted and received in a modulated signal form through one belt provided with a power supply line therein, thereby simplifying a system structure, and particularly, providing a solution optimal for an OHT-type rail car with a relatively long hoist distance.

In addition, according to the present invention, a noise pattern of transmission and reception signals performing power line communication is extracted, and a section where noise does not occur is set to a signal transmission time point, thereby performing more stable signal transmission and reception between the master and the slave.

In addition, according to the present invention, a power state of power supplied to the gripper-unit, a communication state through the power line between the master and the slave, and a physical hoist work state detected by a sensor are managed, thereby more stably performing a hoist work.

While the present invention has been described with respect to the specific embodiments, it will be apparent to those skilled in the art that various changes and modifications may be made without departing from the spirit and scope of the invention as defined in the following claims.

What is claimed is:

1. A communicating method between a master communication device and a slave communication device for controlling a gripper-unit in a hoist device of a rail car, in which the master communication device connected to a rail car controller and the slave communication device connected to the gripper-unit are connected through a belt to operate the gripper-unit in accordance with a control signal of the rail car controller, thereby performing a hoist work, the communicating method comprising:

a first step in which the master communication device provides power supplied from the rail car controller to the slave communication device through a power supply line formed in the belt, and the slave communication device supplies power provided from the master communication device to the gripper-unit;

a second step in which the master communication device modulates the control signal provided from the rail car controller, overlaps the modulated control signal with power, and transmits the modulated control signal overlapped with the power to the slave communication device through the power supply line, and the slave communication device transmits a signal including a response to a control signal to the master communication device through the power supply line formed in the belt; and a third step in which the master communication device or the slave communication device compares voltage of the signal received through the power supply line with preset reference voltage to determine a communication state through the power supply line, and when it is determined as a communication abnormality state, communication abnormality state information is provided to the rail car controller through the master communication device.

2. The communicating method according to claim 1, wherein in the second step, the master communication device or the slave communication device detects noise from the signal received through the power supply line, extracts a noise pattern according to a noise occurrence time point, and sets a section where noise does not occur to a signal transmission time point on a basis of the noise pattern to perform a signal transmission process through the power supply line.

3. The communicating method according to claim 2, wherein in the second step, the master communication device or the slave communication device detects signal strength of noise, amplifies the signal to have a signal level higher than the signal strength of noise to perform the signal transmission process through the power supply line.

4. The communicating method according to claim 2, wherein in the second step, when the noise pattern extracted in the master communication device is a pattern similar to a preset slip ring replacement pattern, slip ring replacement information is provided to the rail car controller.

5. The communicating method according to claim 1, wherein in the first step, the master communication device detects a waveform of the power supplied from the rail car controller, compares the detected power waveform with a preset reference power waveform, stops, when the power waveform is not a normal power waveform, the supplying of the power to the slave communication device, and provides power abnormality state information to the rail car controller.

6. The communicating method according to claim 1, wherein in the third step, the master communication device or the slave communication device determines the communication state on a basis of a signal fed back and received through the power supply line or provided from an opponent controller.

7. The communicating method according to claim 1, wherein in the second step, the master communication device or the slave communication device adds CHECKSUM information for error detection for the signal to be transmitted through the power supply line, to the signal, and modulates and transmits the signal, and an opponent controller analyzes, when error occurs in the CHECKSUM information at the time of demodulating the received signal, a waveform of the received signal, extracts a noise position, and changes a data state of a bit corresponding to the noise position, thereby restores data.

8. The communicating method according to claim 1, further comprising a step in which, in a state where the slave communication device is connected to one or more sensors including a gyro sensor and a tilt sensor in the hoist device and the gripper-unit and receives detection signals detected by the sensors, the slave communication device compares and determines, on a basis of detection signal provided from the sensor, a state of at least one of a belt movement distance, a belt movement speed, a left and right movement distance of the gripper-unit, a collision degree of the hoist device, and a tilt degree of the belt with preset reference information, and transmits work abnormality state information to the master communication device through the power supply line when difference from the reference information more than a predetermined range, and the master communication device transmits the work abnormality state information received from the slave communication device to the rail car controller.

9. The communicating method according to claim 1, further comprising a step in which, in a state where each of the master communication device and the slave communication device is provided with a wireless communication module for performing wireless communication, in the third step, the master communication device or the slave communication device mutually transmits and receives the communication abnormality state information through the wireless communication modules at the time of determining the communication abnormality state through the power supply line.

* * * * *